United States Patent [19]

Ens

[11] 3,884,982
[45] May 20, 1975

[54] PROCESS FOR PREPARING CHLOROMETHYL METHYL ETHER

[75] Inventor: Lawrence A. Ens, Ann Arbor, Mich.

[73] Assignee: The Dow Chemical Company, Midland, Mich.

[22] Filed: July 19, 1973

[21] Appl. No.: 380,777

[52] U.S. Cl. .......................................... 260/614 R
[51] Int. Cl. ...................... C07c 41/00; C07c 41/10
[58] Field of Search ................................ 260/614 R

[56] References Cited
UNITED STATES PATENTS

| | | | |
|---|---|---|---|
| 2,652,432 | 9/1953 | Bauman et al. | 260/614 R |
| 2,667,516 | 1/1954 | Bauman et al. | 260/614 R |
| 2,681,939 | 6/1954 | Bauman et al. | 260/614 R |
| 2,916,522 | 12/1959 | McRae | 260/614 R |
| 3,086,060 | 4/1963 | Greer | 260/614 R |
| 3,356,735 | 12/1967 | Suzuki | 260/614 R X |

FOREIGN PATENTS OR APPLICATIONS 1,056,589   1/1969   United Kingdom ............. 260/614 R

*Primary Examiner*—Howard T. Mars
*Attorney, Agent, or Firm*—David B. Kellom

[57] ABSTRACT

An improved process has been developed for preparing chloromethyl methyl ether containing low concentrations of bis(chloromethyl)ether. Methanol and/or methylal is pretreated with HCl under essentially anhydrous conditions. Then about 0.6-1.0 equivalent of formaldehyde per equivalent of methanol is added at a controlled rate and a temperature below 45°C together with sufficient anhydrous HCl to establish and maintain an essentially HCl saturated reaction mixture. The resulting chloromethyl methyl ether containing a reduced amount of bis(chloromethyl)ether is recovered for use as an intermediate for preparing aromatic chloromethylated compounds.

9 Claims, No Drawings

IMPROVED PROCESS FOR PREPARING CHLOROMETHYL METHYL ETHER

BACKGROUND

Numerous methods for preparing chloromethyl methyl ether have been previously disclosed. Typically, the previous methods have involved the treating of a mixture of formaldehyde and methanol with hydrogen chloride, as shown in U.S. Pat. No. 2,667,516 by Bauman et al. the same general reaction is disclosed in U.S. Pat. Nos. 2,652,432 and 2,681,939, both by Bauman et al., wherein calcium chloride is added to the reaction vessel to form a solution with the water formed as a coproduct. Another route followed by the prior art was the reacting of water and chlorosulfonic acid and contacting the resulting hydrogen chloride countercurrently with a mixture of methanol and formaldehyde, as taught in British Pat. No. 1,258,057.

All of these methods have resulted in the formation of appreciable quantities of highly toxic bis(chloromethyl)-ether. Thus, an improved process for preparing chloromethyl methyl ether in high yield while minimizing the formation of the bis(chloromethyl)ether is highly desirable.

STATEMENT OF THE INVENTION

It has now been discovered that chloromethyl methyl ether can be prepared in good yields with very low concentrations of bis(chloromethyl)ether by (A) pretreating methanol, methylal or mixture thereof with hydrogen chloride under essentially anydrous conditions, (B) adding formaldehyde at a controlled rate and temperature below 45°C together with sufficient anhydrous HCl to establish and maintain an essentially HCl saturated reaction mixture until about 0.6 to 1.0 equivalent of the formaldehyde per equivalent of methanol has been added; and then (C) recovering the chloromethyl methyl ether from the reaction mixture, preferably by separation of the phases.

GENERAL DESCRIPTION

The basic reactions in preparing chloromethyl methyl ether (CMME) from methanol or methylal, HCl and formaldehyde are given in Equations 1–4:

(1) 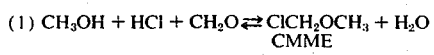 $CH_3OH + HCl + CH_2O \rightleftarrows ClCH_2OCH_3 + H_2O$
    CMME (2) 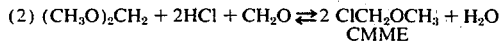 $(CH_3O)_2CH_2 + 2HCl + CH_2O \rightleftarrows 2\ ClCH_2OCH_3 + H_2O$
    CMME (3) 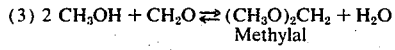 $2\ CH_3OH + CH_2O \rightleftarrows (CH_3O)_2CH_2 + H_2O$
    Methylal (4) 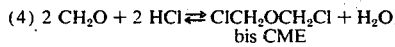 $2\ CH_2O + 2\ HCl \rightleftarrows ClCH_2OCH_2Cl + H_2O$
    bis CME Equations 1 and 2 are the formation of chloromethyl methyl ether, Equation 3 the preparation of methylal, and Equation 4 the formation of the undesired and highly toxic bis(chloromethyl)ether. Also in view of Equations 1–3, it is convenient and informative to express methylal in terms of methanol and formaldehyde equivalents, i.e., methylal is equivalent to two moles of methanol and one mole of formaldehyde. Thus, Equations 1 and 2 both require one equivalent of methanol, formaldehyde, and HCl per mole of chloromethyl methyl ether.

Of critical importance is minimizing the formation of bis(chloromethyl)ether. Since the reactions of Equations 1–4 are all equilibrium reactions, the desired chloromethyl methyl ether is obtained as a mixture with residual reactants and by-products. A careful study of the process has identified four process parameters that affect significantly the yields of chloromethyl methyl ether and by-product bis(chloromethyl)ether: (1) the reaction temperature, (2) the final formaldehyde/methanol ratio, (3) the mode of formaldehyde addition, and (4) the water content of the reaction mixture. By proper control of these parameters, chloromethyl methyl ether can be prepared commercially with less than 100–200 ppm bis-(chloromethyl)ether.

Since the reaction of methanol, HCl, and formaldehyde is highly exothermic, it has normally been carried out at reflux (ca. 45°C). However, at this temperature, significant amounts of bis(chloromethyl)ether are formed. Surprisingly, it has been found that although lowering the reaction temperature has little effect on the rate of formation of chloromethyl methyl ether, it markedly decreases the formation of the bis ether.

Accordingly, the improved process is carried out below 45°C, preferably between about −10°C and 30°C. Lower temperatures are suitable so long as the reaction mixture remains liquid. For commercial operation a reaction temperature of about 0° to 20°C is economically preferred. Also, it is important to pretreat the methanol or methylal with anhydrous HCl. Preferably, the liquid methanol reactant is essentially saturated with HCl prior to addition of formaldehyde. This facilitates temperature control during the subsequent formaldehyde addition and reaction.

The second important parameter is the final ratio of formaldehyde to methanol equivalents. Referring to Equations 1 and 2, it is seen that one mole of methanol or methylal, respectively, react with one mole of formaldehyde. With formaldehyde as the limiting reagent, the theoretical yield of chloromethyl methyl ether is equal to the formaldehyde equivalents present in the final reaction mixture. However, it has been discovered that the molar ratio of formaldehyde to methanol has a large effect on the bis ether content of the product. Less bis ether is formed with a lower formaldehyde to methanol ratio. Although chloromethyl methyl ether can be prepared in acceptable yield using a final formaldehyde to methanol ratio of about 0.6–1.0, for commercial practice a ratio of about 0.75–0.90 is preferred giving high yields of chloromethyl methyl ether with minimum amounts of bis(chloromethyl)ether.

The rate at which formaldehyde is added also affects the efficiency of the process. High formaldehyde concentrations should be avoided. Thus, it is important that the formaldehyde be added to the HCl-treated methanol and/or methylal solution gradually and with good mixing at a controlled rate consistent with maintaining the exothermic reaction within the desired reaction temperature range. The formaldehyde can be added continuously or incrementally, preferably over a period of about 2–5 hours with a reaction temperature of about −10°C to 30°C.

The fourth parameter is the water formed as a coproduct in the reaction. Referring to equilibrium equations 1 and 2, it is seen that water suppresses formation of the chloromethyl methyl ether. Thus, if the water is removed, the yield of chloromethyl methyl ether is increased. A convenient method of removing the free water is to add a desiccant such as calcium chloride to the reaction vessel as suggested by Bauman e.a. U.S. Pat. Nos. 2,652,432 and 2,681,939.

The reactants are commercially available. The methanol and methylal should be essentially anhydrous. Mixtures of methanol and methylal recovered from chloromethylation reactions can be recycled as part of the initial reactor feed. The formaldehyde is preferably added as paraformaldehyde to avoid liquid diluents and added water. However, Formcel, a solution consisting of 55 percent formaldehyde, 35 percent methanol and 10 percent water, can be used although somewhat higher concentrations of bis(chloromethyl)ether are produced.

In practice, the methanol and/or methylal is pretreated with HCl under essentially anhydrous conditions and the HCl-treated liquid is cooled to the desired temperature before formaldehyde is added at a controlled incremental or continuous rate. Additional HCl is added as required to establish and maintain an essentially HCl saturated reaction mixture until the reaction is complete.

Initially only a single liquid phase is present, but as the reaction continues, chloromethyl methyl ether separates as a lighter upper phase. The heavier phase is a mixture mostly of water, methanol, methylal and HCl. When the formaldehyde addition and reaction is complete, the phases are allowed to separate. The chloromethyl methyl ether recovered by the phase separation can be used directly for the chloromethylation of polystyrene and other aromatic materials without further purification. By using the improved process, this chloromethyl methyl ether can be prepared with less than 100–200 ppm bis(chloromethyl)ether.

The following examples illustrate further the improved process. Unless indicated otherwise, all parts and percentages are by weight. Chloromethyl methyl ether, bis(chloromethyl)ether, methanol and methylal are analyzed by gas chromatography after reacting the chloromethyl ethers with a sodium alkoxide or phenate to form more stable derivatives with enhanced sensitivity for standard chromatographic detectors as described in E. F. Ault & R. A. Solomon U.S. Patent applications Ser. No. 303,123 filed Nov. 2, 1972 and Ser. No. 327,184 filed Jan. 26, 1973 now abandoned. The lower level of detection for bis(chloromethyl)ether in liquid mixtures by this method is about 5 ppm.

EXAMPLE 1

CMME from Methanol

A. To show the effect of temperatures on the formation of bis(chloromethyl)ether, a series of experiments were run in which paraformaldehyde was added incrementally to a stirred solution of methanol saturated with hydrogen chloride. The paraformaldehyde was added in increments of 0.1 mole per mole of methanol, allowing 30 minutes to elapse between each addition, until a total of 1.0 mole of paraformaldehyde was added and reacted. The reaction mixtures were homogeneous until the fourth addition of paraformaldehyde when they became cloudy. Thereafter, two distinct phases separated when stirring was stopped.

Samples were withdrawn after each addition and analyzed for bis(chloromethyl)methyl ether. Where there were two phases, the bis CME was found to be only in the upper CMME phase.

Results shown in Table 1 indicate that CMME containing less than about 200 ppm bis CME can be prepared by proper control of the temperature and formaldehyde/methanol mole ratio.

Table 1

| Mole Ratio $CH_2O/CH_3OH$ | Bis(Chloromethyl)Ether, ppm | | | |
|---|---|---|---|---|
| | 0°C. | 20°C. | 25°C. | 45°C. |
| 0.1 | <5 | <5 | N.D. | <5 |
| 0.2 | <5 | <5 | do. | <5 |
| 0.3 | <5 | <5 | do. | <5 |
| 0.4 | <5 | 9 | do. | 24 |
| 0.5 | <5 | 72 | 159 | 213 |
| 0.6 | 14 | 168 | 334 | 578 |
| 0.7 | 24 | 257 | 694 | 1110 |
| 0.8 | 62 | 438 | 1530 | 3100 |
| 0.9 | 123 | 1100 | 3580 | 8760 |
| 1.0 | 326 | 2610 | 7950 | 13600 |

N.D. - Not determined.

B. To show the effect of paraformaldehyde addition rate, a similar series of runs was made at 20°C with paraformaldehyde added in 0.1 mole increments at intervals of 15, 30 and 45 minutes. Typical results are shown in Table 2.

Table 2

| Mole Ratio $CH_2O/CH_3OH$ | Bis(Chloromethyl)Ether, ppm | | |
|---|---|---|---|
| | 15 Min. | 30 Min. | 45 Min. |
| 0.4 | <5 | 9 | <5 |
| 0.5 | 10 | 72 | 25 |
| 0.6 | 67 | 168 | 145 |
| 0.7 | 129 | 257 | 198 |
| 0.8 | 239 | 438 | 366 |
| 0.9 | 489 | 1100 | 2090 |
| 1.0 | 1090 | 2610 | 4490 |

C. To show the effect of formaldehyde source and added desiccant, another series of runs was made at 20°C using paraformaldehyde, Formacel (methanolic HCHO), and added $CaCl_2 \cdot 6H_2O$ (16 parts/100 parts methanol). Typical results are shown in Table 3.

Table 3

| Mole Ratio $CH_2O/CH_3OH$ | Bis(Chloromethyl)Ether, ppm | | |
|---|---|---|---|
| | Paraformaldehyde | Formcel | Paraformaldehyde + $CaCl_2$ |
| 0.5 | 72 | ND | ND |
| 0.6 | 168 | ND | 17 |
| 0.7 | 257 | 456 | 204 |
| 0.8 | 438 | 857 | 377 |
| 0.9 | 1100 | 2020 | 706 |
| 1.0 | 2610 | 3910 | 2090 |

D. The effect on the yield of chloromethyl methyl ether caused by varying the formaldehyde-methanol ratio was illustrated by two experiments conducted at constant temperature, in which methanol was saturated with hydrogen chloride and reacted with a known amount of paraformaldehyde added incrementally. The products were then analyzed for chloromethyl methyl ether. The results are shown in Table 4.

Table 4

| Mole Ratio, $CH_2O/CH_3OH$ | CMME Yield |
|---|---|
| 0.82 | 80% |
| 0.90 | 84% |

EXAMPLE 2

CMME from Methylal

To a solution of methylal saturated with HCl at 20°C under essentially anhydrous conditions was added paraformaldehyde in 0.1 mole increments every 30 minutes. Samples were withdrawn for analysis as in Example 1. After addition of 1 equivalent of formaldehyde per methanol equivalent of methylal, the mixture was stirred an additional 30 minutes and then the upper CMME product phase separated.

Results from this and a similar run carried out at 0°C are given in Table 5.

Table 5

| Mole Ratio $CH_2O/CH_3OH$ | Bis(Chloromethyl)Ether, ppm | |
|---|---|---|
| | 0°C | 20°C |
| 0.5 | <5 | <5 |
| 0.7 | — | <5 |
| 0.8 | — | 13 |
| 0.9 | — | 60 |
| 0.95 | 13 | — |
| 1.0 | — | 200 |

EXAMPLE 3

CMME from Methanol-Methylal

A. In another series of experiments, a liquid mixture of 10 parts methanol and 35 parts methylal was saturated with HCl and then reacted with 1 equivalent of paraformaldehyde added in 0.1 mole increments. Typical yields of CMME and the bis CME content are shown in Table 6. Lower temperatues favor both CMME yield and reduced bis CME.

Table 6

| Reaction T °C | Yield CMME | Bis CME, ppm |
|---|---|---|
| 20°C | 98.2% | 300 |
| 33° | 96.0% | 1700 |
| 40° | 89.7% | 8000 |

B. A series of experiments were conducted to show the effect on the yield of chloromethyl methyl ether caused by the inclusion of a desiccant with the reactants. Portions of the methylal-methanol mixture of Example 3A were saturated with hydrogen chloride in the presence of calcium chloride and then reacted with paraformaldehyde at specified temperatures. The reaction products were then analyzed for chloromethyl methyl ether and bis(chloromethyl)ether. The pertinent data are shown in Table 7.

Table 7

| Reaction T °C | g. $CaCl_2$/ g. HCHO | Yield CMME | Bis CME, ppm |
|---|---|---|---|
| 31 | 0.00 | 79% | — |
| 31 | 0.33 | 93% | — |
| 40 | 0.00 | 63% | 8000 |
| 40 | 0.16 | 73% | 3100 |
| 40 | 0.33 | 71% | 2500 |

I claim:

1. An improved process for preparing chloromethyl methyl ether containing a reduced level of bis-chloromethyl ether comprising:
   A. Saturating methanol, methylal or a liquid mixture thereof with HCl under essentially anhydrous conditions;
   B. Adding formaldehyde at a controlled rate consistent with maintaining a reaction temperature between about −10°C and 45°C together with sufficient anhydrous HCl to maintain an essentially HCl saturated reaction mixture until about 0.6 to 1.0 equivalent of formaldehyde per equivalent of methanol has been added; and then
   C. Recovering chloromethyl methyl ether from the reaction mixture.

2. A process as in claim 1 wherein the liquid pretreated with hydrogen chloride is methanol.

3. A process as in claim 1 wherein the liquid pretreated with hydrogen chloride is methylal.

4. A process as in claim 1 wherein the liquid pretreated with hydrogen chloride is a recycle mixture containing methanol and methylal.

5. A process as in claim 1 wherein the addition of formaldehyde is carried out at a controlled rate at a temperature of from about −10° to about 30°C.

6. A process as in claim 1 wherein the formaldehyde is added as paraformaldehyde.

7. A process as in claim 1 wherein about 0.75 to 0.90 equivalents of formaldehyde are added per equivalent of methanol.

8. A process as in claim 1 wherein the addition of formaldehyde is carried out in the presence of calcium chloride as a desiccant.

9. A process as in claim 1 wherein:
   A. A liquid mixture containing methanol and methylal is saturated with anhydrous hydrogen chloride and then cooled to about − ° to 30°C;
   B. Paraformaldehyde is added to the HCl saturated mixture at a controlled rate while maintaining HCl saturation and a reaction temperature of about −10°C to 30°C until about 0.75 to 0.90 equivalents of formaldehyde are added per equivalent of methanol; and then
   C. Chloromethyl methyl ether containing less than 200 ppm bis(chloromethyl)ether is recovered.

* * * * *

UNITED STATES PATENT AND TRADEMARK OFFICE
CERTIFICATE OF CORRECTION

PATENT NO. : 3,884,982
DATED : May 20, 1975
INVENTOR(S) : Lawrence A. Ens

It is certified that error appears in the above-identified patent and that said Letters Patent are hereby corrected as shown below:

Column 6, line 48 (Claim 9, line 4): "about - ° to 30°C;" should be --about -10° to 30°C;--.

Signed and Sealed this fourteenth Day of October 1975

[SEAL]

Attest:

RUTH C. MASON
*Attesting Officer*

C. MARSHALL DANN
*Commissioner of Patents and Trademarks*